United States Patent
Ma et al.

(10) Patent No.: US 12,429,399 B1
(45) Date of Patent: Sep. 30, 2025

(54) DYNAMIC ACOUSTIC EMISSION IN-SITU TESTING DEVICE AND METHOD FOR ELECTROMAGNETIC RAIL LAUNCHER

(71) Applicant: JILIN UNIVERSITY, Changchun (CN)

(72) Inventors: Zhichao Ma, Changchun (CN); Jiakai Li, Changchun (CN); Chaofan Li, Changchun (CN); Zimiao Wang, Changchun (CN); Zhengchen Han, Changchun (CN); Hongcai Xie, Changchun (CN); Wei Zhang, Changchun (CN); Shengteng Zhao, Changchun (CN); Shuai Tong, Changchun (CN); Junming Xiong, Changchun (CN); Zixin Guo, Changchun (CN); Hongwei Zhao, Changchun (CN); Luquan Ren, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 18/754,021

(22) Filed: Jun. 25, 2024

(30) Foreign Application Priority Data

Jun. 14, 2024 (CN) .......................... 202410766113.6

(51) Int. Cl.
*G01M 5/00* (2006.01)
*F41B 6/00* (2006.01)

(52) U.S. Cl.
CPC ........ *G01M 5/0058* (2013.01); *G01M 5/0066* (2013.01); *G01M 5/0091* (2013.01); *F41B 6/006* (2013.01)

(58) Field of Classification Search
CPC ............ G01M 5/0058; G01M 5/0066; G01M 5/0091; F41B 6/006
See application file for complete search history.

(56) References Cited

U.S. PATENT DOCUMENTS

2012/0113756 A1    5/2012    Carcaterra

FOREIGN PATENT DOCUMENTS

| CN | 103940736 A | 7/2014 |
|---|---|---|
| CN | 105181583 A | 12/2015 |
| CN | 110987700 B | 4/2020 |
| CN | 111076607 B | 4/2020 |
| CN | 115979850 A | 4/2023 |

(Continued)

*Primary Examiner* — Lee E Rodak
*Assistant Examiner* — Sangkyung Lee
(74) *Attorney, Agent, or Firm* — Birchwood IP

(57) ABSTRACT

The present invention provides a dynamic acoustic emission in-situ testing device and method for an electromagnetic rail launcher. The device comprises an armature, a guide rail and a support base, wherein the support base comprises an upper support base and a lower support base which are opposite to each other and are vertically arranged, a distance between the upper support base and the lower support base can be adjusted through bolts, the guide rail is vertically arranged between the upper support base and the lower support base, the armature is clamped in the guide rail, a plurality of groups of static acoustic emission sensors are arranged along the guide rail, a dynamic acoustic emission sensor is arranged on the armature. The method can comprehensively reveal the current-carrying friction damage mechanism of the armature-rail interface under the variable magnetic field intensity condition.

5 Claims, 1 Drawing Sheet

(56) References Cited

FOREIGN PATENT DOCUMENTS

| CN | 116879002 A | 10/2023 |
| CN | 117804949 A | 4/2024 |
| CN | 118150706 A | 6/2024 |

DYNAMIC ACOUSTIC EMISSION IN-SITU TESTING DEVICE AND METHOD FOR ELECTROMAGNETIC RAIL LAUNCHER

CROSS-REFERENCE TO RELATED APPLICATIONS

This application claims priority to Chinese Patent Application No. 202410766113.6 filed on Jun. 14, 2024, which is hereby incorporated by reference in its entirety.

TECHNICAL FIELD

The present invention relates to the field of electromagnetic rail launch technology, and specifically to a dynamic acoustic emission in-situ testing device and method for an electromagnetic rail launcher.

BACKGROUND

Electromagnetic rail launch technology achieves instantaneous high-power conversion between electromagnetic energy and kinetic energy, breaks through the energy and velocity limits of traditional launch methods, and can launch heavy-loaded targets at ultra-high velocity. The electromagnetic rail launch system has the advantages such as high initial velocity, long range, large range of projectile mass, and flexible structure, which can be used in fields such as high-energy physics, space launch, and super high-speed rail. Therefore, the requirements for the safety, reliability and durability of electromagnetic rail launch technology are extremely high. In actual work, the armature used for linear propulsion acts as a carrier of transient emission under the action of a strong magnetic field and electromagnetic force. It is a motion carrier of transient electromagnetic energy-mechanical energy conversion, and is subject to extreme impact of electromagnetic-thermal multi-field coupling and current-carrying sliding friction. Meanwhile, the parallel fixed guide rails of the electromagnetic rail launch system are used as a core structure for transmitting strong current and carrying the armature movement, and are subjected to lateral electromagnetic forces perpendicular to the direction of armature movement and friction at the armature-rail interface. The service performance of the parallel fixed guide rails directly affects the launch performance and working efficiency of the electromagnetic rail launch system. However, the deformation damage mechanism and performance degradation law of key components such as guide rails and armatures under multi-field coupled high-speed current-carrying friction conditions are unclear, and the interface wear resistance needs to be strengthened urgently, which seriously restricts the innovative research and development of the launch system. Therefore, it is proposed to construct equivalent working conditions of the electromagnetic rail launch system and perform equivalent in-situ tests under conditions close to the service conditions to reveal the friction failure mechanism of the armature-rail interface and ensure the long-term safe service of the electromagnetic rail launch system.

Most of the existing tests on the friction service performance of the armature-rail interface depend on dynamic capture of material deformation behavior in a current-carrying friction process by a high-speed camera or static characterization of a scanning/transmission electron microscope, can directly obtain the mechanical property of the material in a single static and dynamic or impact load mode, and can research the characteristics of the material such as the deformation behavior, wear mechanism, fracture mechanism and impact toughness in steps by combining with a material characterization analysis technology. However, it is difficult for the traditional test mode to dynamically monitor the continuous evolution of material microstructures under various loads or physical field conditions, that is, it is impossible to establish a real-time correlation of "environmental working condition-microstructure-service performance" of the material. In addition, under the actual service working condition, the damage failure of the guide rail and the armature material of the electromagnetic rail launch system under the extreme conditions of electromagnetic-thermal multi-field coupling is attributed to the coupling action of high-speed interface friction, electromagnetic force, high temperature and the like, and the macroscopic damage phenomenon is attributed to the microscopic defects under the multi-external-field action and the dynamic evolution of the microstructure at the surface/interface. The existing testing technology is limited by a single characterization technology, cannot simultaneously obtain dynamic mechanical response, temperature distribution and micro-area damage of the material, and thus does not meet the requirement of friction service performance testing of the armature-rail interface any more. Therefore, it is urgent to develop a device that can achieve in-situ monitoring and follow-up monitoring under the extreme current-carrying friction working conditions of the constructed equivalent multi-physical field coupling armature-rail interface.

SUMMARY

In view of the above, the present invention aims to provide a dynamic acoustic emission in-situ testing device and method for an electromagnetic rail launcher, which can perform in-situ acoustic testing on a current-carrying friction damage mechanism of an armature-rail interface emitted by an electromagnetic rail under a variable magnetic field intensity condition, collect acoustic signals in the current-carrying friction process through a dynamic and static cooperative acoustic emission in-situ testing unit, further perform spectrum analysis to obtain an acoustic response characteristic of friction and wear of the armature-rail interface, and perform a multi-modal synchronous characterization of "surface morphology-temperature distribution-frequency matching" on a micro-area of the armature-rail contact interface by combining with an in-situ monitoring module to reveal the current-carrying friction damage mechanism of the armature-rail interface under the variable magnetic field intensity condition.

To solve at least one of the above technical problems, the present invention provides technical solutions as follows.

Provided is a dynamic acoustic emission in-situ testing device for an electromagnetic rail launcher, which comprises an armature, a guide rail, a support base, bolts, an optical imaging module, an infrared imaging module, a static acoustic emission sensor, a dynamic acoustic emission sensor and a control module, wherein the support base comprises an upper support base and a lower support base, the upper support base is arranged right above the lower support base at an interval, and a plurality of groups of bolts which are connected to the upper support base and the lower support base are arranged between the upper support base and the lower support base, so that a distance between the upper support base and the lower support base can be adjusted through the bolts;

the guide rail comprises a strip-shaped upper guide rail and a strip-shaped lower guide rail arranged at an interval, the upper guide rail is arranged on the upper support base, the lower guide rail is arranged on the lower support base, the upper guide rail and the lower guide rail are kept parallel on a vertical plane, a plurality of groups of static acoustic emission sensors distributed along the upper guide rail are detachably arranged on the upper guide rail at intervals, and a plurality of groups of static acoustic emission sensors distributed along the lower guide rail are detachably arranged on the lower guide rail at intervals;

the armature is arranged on the guide rail, the armature contacts the upper guide rail and the lower guide rail, so that the armature and the guide rail can form a conductive path, the armature can slide along the guide rail, and the armature is detachably provided with the dynamic acoustic emission sensor;

the support base is externally provided with an optical imaging module configured to obtain optical imaging of an area where the armature and the guide rail are located and an infrared imaging module configured to obtain infrared imaging of an area where the armature and the guide rail are located; and the support base is also externally provided with a control module, the control module is in communication connection with the guide rail, the optical imaging module, the infrared imaging module, the static acoustic emission sensor and the dynamic acoustic emission sensor.

According to one embodiment of the present invention, the armature is saddle-shaped, and a top surface and a bottom surface of which are parallel to each other and contact the upper guide rail and the lower guide rail respectively.

Further, the dynamic acoustic emission sensors are arranged on two sides of the armature.

According to one embodiment of the present invention, the plurality of groups of bolts are arranged at intervals along an extension direction of the guide rail and distributed on two sides of the guide rail.

Further, a plurality of groups of high-strength springs are arranged between the upper support base and the lower support base at intervals, and the high-strength springs are distributed on two sides of the guide rail and are alternately arranged with the bolts in a collinear manner.

According to one embodiment of the present invention, the static acoustic emission sensors are distributed along two sides of the upper guide rail and the lower guide rail.

According to one embodiment of the present invention, the optical imaging module is a high-speed camera, a range of the high-speed zoom lens of which completely covers the armature and the guide rail.

According to one embodiment of the present invention, the infrared imaging module is an infrared thermal imager, a thermal imaging range of which completely covers the armature and the guide rail.

In addition, the present invention further provides a dynamic acoustic emission in-situ testing method for an electromagnetic rail launcher, which adopts the device for testing and comprises the following steps:

step S1: adjusting a distance between the upper guide rail and the lower guide rail by adjusting a distance between bolts according to magnetic field intensity conditions and experimental conditions, and uniformly arranging a plurality of groups of static acoustic emission sensors on the upper guide rail and the lower guide rail;

step S2: arranging an armature between the upper guide rail and the lower guide rail, and arranging a dynamic acoustic emission sensor on a side surface of the armature;

step S3: arranging an optical imaging module and an infrared imaging module outside the support base, enabling an optical imaging range and a thermal imaging range to completely cover the armature and the guide rail, and adjusting measurement parameters based on an experiment requirement; and step S4: supplying power to a guide rail to generate an induced magnetic field to drive the armature to move between the guide rails, performing an electromagnetic launch process, measuring wideband frequency response of current-carrying friction of an armature-rail contact interface in the electromagnetic launch process through the static acoustic emission sensor, measuring resonant frequency response of the current-carrying friction of the armature-rail contact interface in the electromagnetic launch process through the dynamic acoustic emission sensor, collecting temperature distribution change in the electromagnetic launch process through the infrared imaging module, and collecting shape change of a friction surface between the armature and the guide rail in the electromagnetic launch process through the optical imaging module.

The present invention has the technical effects as follows.

1. The dynamic acoustic emission in-situ testing device for the electromagnetic rail launcher with the variable magnetic field intensity provided by the present invention has the characteristics of wide magnetic field intensity range, high signal-to-noise ratio and wide frequency response range, so that the testing result is more accurate.

2. The present invention can achieve the adjustment of the distance between the guide rails by the high-strength springs and the long bolts, construct a launch condition with variable magnetic field strength, and has a wide range of applications.

3. According to the present invention, acoustic signals in the current-carrying friction process are collected through the dynamic and static cooperative acoustic emission in-situ testing unit, the acoustic response characteristics of friction and wear of the armature-rail interface are obtained after further spectrum analysis is performed, and a multi-modal synchronous characterization of "surface morphology-temperature distribution-frequency matching" is performed on the micro-area of the armature-rail contact interface by combining the in-situ monitoring module, so that the current-carrying friction damage mechanism of the armature-rail interface under the variable magnetic field intensity condition in the electromagnetic rail emission process can be comprehensively revealed, and a powerful support in the aspects of equipment and methods is provided for related researches.

BRIEF DESCRIPTION OF DRAWINGS

To describe the technical solutions in embodiments of the present invention more clearly, the following briefly describes the accompanying drawings used for describing embodiments. It should be understood that the accompanying drawings show only some embodiments of the present invention, and therefore should not be considered as a limitation on the scope. Those of ordinary skill in the art may still derive other related drawings from these accompanying drawings without creative efforts.

DETAILED DESCRIPTION OF EMBODIMENTS

The present invention is further described in detail below with reference to the embodiments and drawings.

To make objectives, technical solutions, and advantages of embodiments of the present invention clearer, the following clearly and completely describes the technical solutions in embodiments of the present invention with reference to the accompanying drawings in embodiments of the present invention. It is clear that the described embodiments are some but not all of embodiments of the present invention. Based on the embodiments of the present invention, all other embodiments obtained by those of ordinary skill in the art without creative effort shall fall within the protection scope of the present invention. Therefore, the following detailed descriptions of embodiments of the present invention provided in the accompanying drawings are not intended to limit the scope of the present invention that claims protection, but merely to represent selected embodiments of the present invention.

EMBODIMENT

Figure 1:
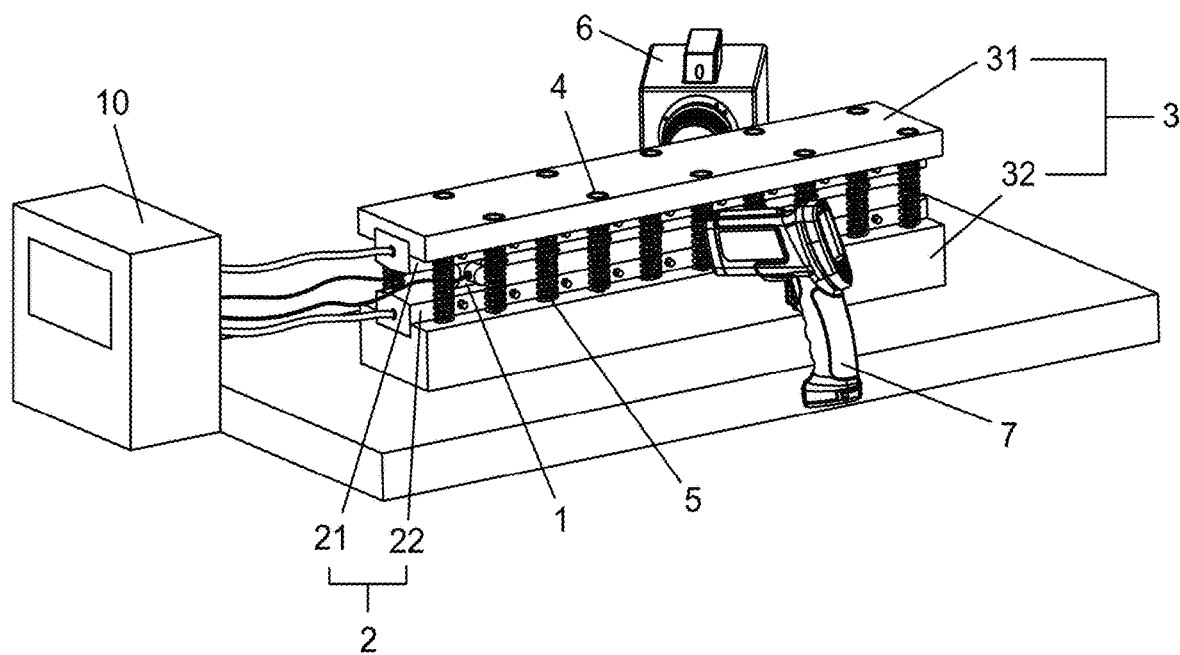
FIG. 1 is an overall schematic isometric view of the present invention.

Referring to FIG. 1, a dynamic acoustic emission in-situ testing device for an electromagnetic rail launcher comprises an armature 1, a guide rail 2, a support base 3, bolts 4, an optical imaging module 6, an infrared imaging module 7, a static acoustic emission sensor 8, a dynamic acoustic emission sensor 9 and a control module 10, wherein the support base 3 comprises an upper support base 31 and a lower support base 32, the upper support base 31 is arranged right above the lower support base 32 at an interval, and a plurality of groups of bolts 4 which are connected to the upper support base 31 and the lower support base 32 are arranged therebetween, so that a distance between the upper support base 31 and the lower support base 32 can be adjusted through the bolts 4. By adjusting the distance between bolts 4, the distance between guide rails 2 can be adjusted, so that the guide rail 2 can be in close contact with the armatures 1 with different sizes, an experimenter is allowed to adjust a test object based on a requirement, and the application range of the device is expanded. In this embodiment, the plurality of groups of bolts 4 are arranged at intervals along an extension direction of the guide rail 2 and distributed on two sides of the guide rail 2, and the bolts 4 are arranged at intervals as shown in FIG. 1, so that the stress at two sides of the guide rail 2 is more uniform, thereby ensuring the parallel state between the upper guide rail 21 and the lower guide rail 22. Meanwhile, a plurality of groups of high-strength springs 5 are arranged between the upper support base 31 and the lower support base 32 at intervals, and the high-strength springs 5 are distributed on two sides of the guide rail 2 and are alternately arranged with the bolts 4 in a collinear manner, the bolts 4 and the high-strength springs 5 are alternately and continuously distributed on a straight line, two straight lines consisting of the bolts 4 and the high-strength springs 5 are arranged on both sides of the guide rail 2, the uniformity and the stability of the support are further improved, when the distance between the upper guide rail 21 and the lower guide rail 22 is adjusted, the upper guide rail and the lower guide rail can approach each other more smoothly, and a gap between the guide rail 2 and the armature 1 is avoided. Obviously, to better achieve the acceleration effect for the armature 1, the upper support base 31 and the lower support base 32 should be maintained in a parallel state as shown in FIG. 1.

Figure 2:
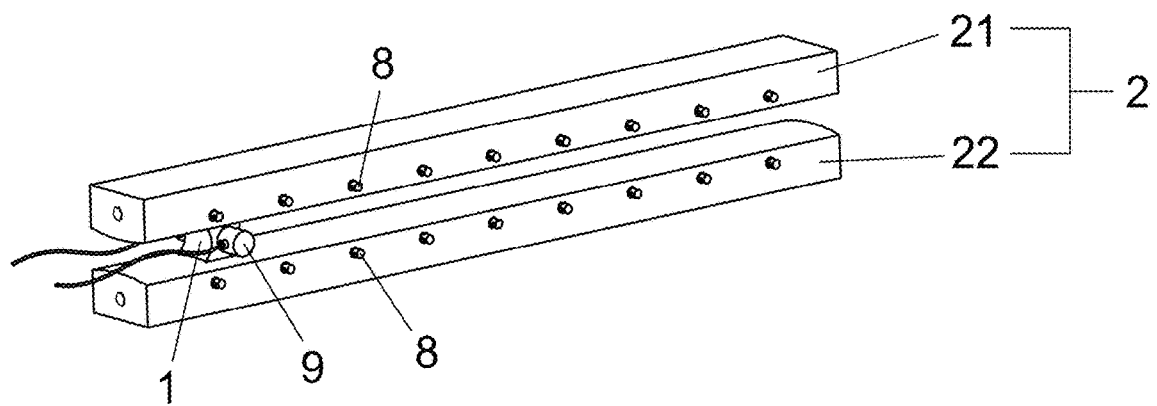
FIG. 2 is a schematic diagram of a structure of a guide rail and an armature according to the present invention; and in the drawings, 1: armature, 2: guide rail, 3: support base, 4: bolt, 5: high-strength spring, 6: optical imaging module, 7: infrared imaging module, 8: static acoustic emission sensor, 9: dynamic acoustic emission sensor, 10: control module, 21: upper guide rail, 22: lower guide rail, 31: upper support base, and 32: lower support base.

Referring to FIG. 2, the guide rail 2 comprises an upper guide rail 21 and a lower guide rail 22 which are arranged at an interval in a strip shape, the guide rail 2 is a conductor conventionally used in the prior art, wherein the upper guide rail 21 is arranged on the upper support base 31, the lower guide rail 22 is arranged on the lower support base 32, the upper guide rail 21 and the lower guide rail 22 are kept parallel on a vertical plane, a plurality of groups of static acoustic emission sensors 8 distributed along the upper guide rail 21 are detachably arranged on the upper guide rail 21 at intervals, and a plurality of groups of static acoustic emission sensors 8 distributed along the lower guide rail 22 are detachably arranged on the lower guide rail 22 at intervals, and the detachable structure can be achieved by a bonding manner conventionally used in the art. The armature 1 is arranged on the guide rail 2, which is also a conductor conventionally used in the art, the armature 1 is in contact with the upper guide rail 21 and the lower guide rail 22, so that the armature 1, the upper guide rail 21 and the lower guide rail 22 can form a loop with an external power supply, the induced magnetic field generated by the loop can drive the armature 1 to slide along the guide rail 2, thereby achieving electromagnetic rail emission for the armature 1.

In addition, the guide rail 2 and the support base 3 can be set vertically as described above, and the guide rail 2 and the support base 3 can be arbitrarily rotated with the movement trajectory of the armature 1 as an axis based on an experimental requirement, and the positions of the rest of the testing devices can be adjusted accordingly, for example, the upper support base 31 and the lower support base 32, and the upper guide rail 21 and the lower guide rail 22 can be adjusted to be in a horizontal plane state, so that the application range of the testing device is expanded.

The armature 1 can be also detachably provided with a dynamic acoustic emission sensor 9, and the detachable arrangement mode thereof is the same as that of the static acoustic emission sensor 8. When the experimental device is assembled, the setting positions and the number of the static and dynamic acoustic emission sensors can be adjusted based on a requirement, so that the application range of the experiment is expanded. In addition, in this embodiment, the static acoustic emission sensors 8 are distributed along two sides of the upper guide rail 21 and the lower guide rail 22, and the static acoustic emission sensors are uniformly distributed on two sides of the guide rails, so that acoustic response signals in a wide frequency range can be measured, and a wideband frequency response of the current-carrying friction of the armature-rail contact interface in the electromagnetic rail emission process can be captured. Simultaneously, the armature 1 is saddle-shaped. By adjusting the distance between the upper guide rail 21 and the lower guide rail 22, the top surface and the bottom surface of the armature 1 can be made parallel to each other and contact the upper guide rail 21 and the lower guide rail 22 respectively. Therefore, the contact effect between the armature 1 and the upper guide rail 21 and the lower guide rail 22 is improved, the normal operation of the conductive circuit is ensured, and the stability of the induced magnetic field and the smooth electromagnetic rail launch process are further ensured, which provides stable experimental conditions for the research of the friction between the armature 1 and the upper guide rail 21 and the lower guide rail 22 in the electromagnetic rail launch process. In this embodiment, the dynamic acoustic emission sensors 9 are arranged on two sides of the armature 1, and the symmetrically arranged dynamic acoustic emission sensors can measure the resonant frequency response of the current-carrying friction of the armature-rail contact interface in the electromagnetic launch process with higher amplitude response, higher signal-to-noise ratio, and higher resonance response.

Referring to FIG. 1, the support base 3 is externally provided with an optical imaging module 6 configured to obtain optical imaging of the armature 1 and the guide rail 2 and an infrared imaging module 7 configured to obtain infrared imaging of the armature 1 and the guide rail 2. In this embodiment, the optical imaging module 6 is a high-speed camera, a range of the high-speed zoom lens of which completely covers the armature 1 and the guide rail 2, and the infrared imaging module 7 is an infrared thermal imager, a thermal imaging range of which completely covers the armature 1 and the guide rail 2. Based on the prior art, it is known that the high-speed camera is mounted with a high-speed zoom lens and an optical lens configured to adjust a focal length and a magnification, the infrared thermal imager can adjust an infrared imaging area, and can be used to test a temperature distribution and a dynamic temperature gradient of the micro-area of the armature-rail contact interface, when an electromagnetic launch experiment is performed, the high-speed camera can capture a contact friction full-range image of the armature 1, the upper guide rail 21 and the lower guide rail 22 during electromagnetic launch, the infrared thermal imager can collect the thermal distribution when the armature 1 is in contact friction with the upper guide rail 21 and the lower guide rail 22, so that the friction state and the temperature distribution information in the electromagnetic launch process can be accurately obtained.

The support base 3 is further externally provided with a control module 10, the control module 10 is in communication connection with the guide rail 2, the optical imaging module 6, the infrared imaging module 7, the static acoustic emission sensor 8 and the dynamic acoustic emission sensor 9 and is configured to control the testing work of the testing device and store the collected images and sound data, and the communication connection mode comprises a wired communication connection and a wireless communication connection. Based on the prior art, it is known that the control module 10 can adopt conventional central control equipment integrated with a power supply in the art. When the wired communication connection is adopted, the control module 10 can refer to the prior art, an electric connecting wire is added while the testing equipment is controlled to achieve power supply to the testing device, and the magnetic field intensity is further adjusted by controlling the current of the power supply. When the wireless communication connection is adopted, the testing device can be configured to be powered in a power supply carrying mode. When the guide rail 2 is connected to the control module 10, the power supply, the armature 1 and the guide rail 2 form a conductive loop, an induced magnetic field is generated to drive the armature 1 to move along the guide rail 2, an electromagnetic rail launch process is achieved, optical image signals and infrared thermal imaging signals between the guide rail 2 and the armature 1 in the launch process are respectively collected by the optical imaging module 6 and the infrared imaging module 7 and then transmitted to the control module 10, the static acoustic emission sensor 8 and the dynamic acoustic emission sensor 9 are configured to collect an acoustic band response signal in the launch process and transmit the acoustic band response signal to the control module 10, and the communication connection mode can be selected randomly based on an actual requirement.

The testing method based on the dynamic acoustic emission in-situ testing device for the electromagnetic rail launcher comprises the following steps:

step S1: adjusting a distance between the upper guide rail and the lower guide rail by adjusting a distance between bolts according to magnetic field intensity conditions and experimental conditions, and uniformly arranging a plurality of groups of static acoustic emission sensors on the upper guide rail and the lower guide rail;

step S2: arranging an armature between the upper guide rail and the lower guide rail, and arranging a dynamic acoustic emission sensor on a side surface of the armature;

step S3: arranging an optical imaging module and an infrared imaging module outside the support base, enabling an optical imaging range and a thermal imaging range to completely cover the armature and the guide rail, and adjusting measurement parameters based on an experiment requirement; and step S4: supplying power to a guide rail to generate an induced magnetic field to drive the armature to move between the guide rails, performing an electromagnetic launch process, measuring wideband frequency response of current-carrying friction of an armature-rail contact interface in the electromagnetic launch process through the static acoustic emission sensor, measuring resonant frequency response of the current-carrying friction of the armature-rail contact interface in the electromagnetic launch process through the dynamic acoustic emission sensor, collecting temperature distribution change in the electromagnetic launch process through the infrared imaging module, and collecting shape change of a friction surface between the armature and the guide rail in the electromagnetic launch process through the optical imaging module.

The static acoustic emission sensor is configured to capture an acoustic signal generated by current-carrying friction of the armature-rail contact interface at a fixed point, the acoustic signal is specifically represented as an elastic wave, the wave velocity of this elastic wave in the medium is influenced by various factors, and the high-frequency signal will decay rapidly with the increase of propagation distance, so that the static acoustic emission sensor can only perform wideband frequency analysis on the collected signals under more conditions. Based on this, the dynamic acoustic emission sensor introduced by the present invention can move along with the armature, the elastic wave is closer to the sensor than to the test object, and the high-frequency attenuation is negligible. That is, the dynamic acoustic emission sensor is more sensitive to a high-frequency part, so that the high-frequency part which cannot be collected by the static acoustic emission sensor can be captured. It can be seen that the dynamic and static cooperative acoustic emission in-situ test in the present invention can capture the full-frequency response of the armature-rail contact interface in the electromagnetic emission process, and better match and reveal the friction damage mechanism.

In the description of the present invention, it should be noted that directions or positional relationships indicated by terms such as "upper", "lower", "front", "rear", "left", "right", "top", "bottom", "in", "out" are those shown based on the accompanying drawings, are merely intended to facilitate and simplify description rather than indicate or imply that the indicated device or element must have a specific direction and be structured and operated according to the specific direction, and should not be construed as limiting the present invention.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention. Therefore, the protection scope of the present invention shall be subject to the protection scope of the claims.

What is claimed is:

1. A dynamic acoustic emission in-situ testing device for an electromagnetic rail launcher, comprising an armature, a guide rail, a support base, bolts, an optical imaging module, an infrared imaging module, static acoustic emission sensors, dynamic acoustic emission sensors and a control module, wherein the support base comprises an upper support base and a lower support base, the upper support base is arranged right above the lower support base at an interval, and a plurality of groups of bolts which are connected to the upper support base and the lower support base are arranged therebetween, so that a distance between the upper support base and the lower support base can be adjusted through the bolts;

the guide rail comprises a strip-shaped upper guide rail and a strip-shaped lower guide rail arranged at an interval, the upper guide rail is arranged on the upper support base, the lower guide rail is arranged on the lower support base, the upper guide rail and the lower guide rail are kept parallel on a vertical plane, a plurality of groups of static acoustic emission sensors distributed along the upper guide rail are detachably arranged on the upper guide rail at intervals, and a plurality of groups of static acoustic emission sensors distributed along the lower guide rail are detachably arranged on the lower guide rail at intervals, wherein the static acoustic emission sensors are distributed along two sides of the upper guide rail and the lower guide rail;

the armature is arranged on the guide rail, the armature contacts the upper guide rail and the lower guide rail, so that the armature and the guide rail can form a conductive path, the armature can slide along the guide rail, and the armature is detachably provided with the dynamic acoustic emission sensors, wherein the armature is saddle-shaped, and a top surface and a bottom surface of which are parallel to each other and contact the upper guide rail and the lower guide rail respectively; the dynamic acoustic emission sensors are arranged on two sides of the armature;

the support base is externally provided with the optical imaging module configured to obtain optical imaging of an area where the armature and the guide rail are located and the infrared imaging module configured to obtain infrared imaging of an area where the armature and the guide rail are located; and the support base is also externally provided with the control module, the control module is in communication connection with the guide rail, the optical imaging module, the infrared imaging module, the static acoustic emission sensors and the dynamic acoustic emission sensors.

2. The dynamic acoustic emission in-situ testing device for the electromagnetic rail launcher according to claim 1, wherein the plurality of groups of bolts are arranged at intervals along an extension direction of the guide rail and distributed on two sides of the guide rail.

3. The dynamic acoustic emission in-situ testing device for the electromagnetic rail launcher according to claim 2, wherein a plurality of groups of high-strength springs are arranged between the upper support base and the lower support base at intervals, and the high-strength springs are distributed on two sides of the guide rail and are alternately arranged with the bolts in a collinear manner.

4. The dynamic acoustic emission in-situ testing device for the electromagnetic rail launcher according to claim 1, wherein the optical imaging module is a high-speed camera, a shooting range of the camera high-speed camera completely covers the armature and the guide rail.

5. The dynamic acoustic emission in-situ testing device for the electromagnetic rail launcher according to claim 1, wherein the infrared imaging module is an infrared thermal imager, a thermal imaging range of which completely covers the armature and the guide rail.

\* \* \* \* \*